(12) United States Patent
Meyer et al.

(10) Patent No.: US 8,552,107 B2
(45) Date of Patent: Oct. 8, 2013

(54) FUMED SILANIZED SILICA

(75) Inventors: Jürgen Meyer, Stockstadt (DE); Mario Scholz, Gründau (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/406,727

(22) Filed: Feb. 28, 2012

(65) Prior Publication Data

US 2012/0220694 A1  Aug. 30, 2012

Related U.S. Application Data

(62) Division of application No. 12/085,954, filed as application No. PCT/EP2006/069308 on Dec. 5, 2006, now Pat. No. 8,211,971.

(30) Foreign Application Priority Data

Dec. 25, 2005 (EP) .................................. 05112922

(51) Int. Cl.
  *C08L 83/04* (2006.01)
(52) U.S. Cl.
  USPC ........................................................ 524/588
(58) Field of Classification Search
  USPC ........................................................ 524/588
  See application file for complete search history.

(56) References Cited

U.S. PATENT DOCUMENTS

| 4,760,123 | A  | 7/1988  | Imai et al.   |
| 6,593,393 | B2 | 7/2003  | Frahn et al.  |
| 6,809,149 | B2 | 10/2004 | Kerner et al. |
| 7,144,930 | B2 | 12/2006 | Meyer et al.  |
| 7,563,317 | B2 | 7/2009  | Meyer et al.  |
| 2002/0077407 | A1 | 6/2002  | Meyer et al. |
| 2002/0168524 | A1 | 11/2002 | Kerner et al. |
| 2003/0181565 | A1 | 9/2003  | Panz et al.  |
| 2003/0195290 | A1 | 10/2003 | Scholz et al. |
| 2005/0241531 | A1 | 11/2005 | Meyer et al. |
| 2005/0244642 | A1 | 11/2005 | Meyer et al. |

FOREIGN PATENT DOCUMENTS

| CN | 1408771      | 4/2003  |
| CN | 1678696      | 10/2005 |
| JP | 6-87609      | 3/1994  |
| JP | 6-27267      | 4/1994  |
| JP | 2000-256008  | 9/2000  |
| JP | 2002-129066  | 5/2002  |
| JP | 2002-179946  | 6/2002  |
| JP | 2002-194246  | 7/2002  |
| JP | 2003-253120  | 9/2003  |
| JP | 2005-536611  | 12/2005 |
| WO | 2004/020532  | 3/2004  |

OTHER PUBLICATIONS

Japanese Office Action issued on Aug. 4, 2011 for Application No. 2008-546348 (in English language).
Chinese Office Action for Application No. 200680048811.2 (English language).

*Primary Examiner* — Kuo-Liang Peng
(74) *Attorney, Agent, or Firm* — Smith, Gambrell & Russell, LLP

(57) ABSTRACT

Fumed silanized silica with the following physico-chemical data: Grindometer value less than 20 .mu.m Tamped density 25 to 85 g/l is prepared by grinding fumed silica which has been silanized. It can be used in silicone rubber.

3 Claims, 8 Drawing Sheets

FUMED SILANIZED SILICA

CROSS-REFERENCE TO RELATED APPLICATIONS

This application is a divisional of application Ser. No. 12/085,954 filed on Aug. 18, 2009, now U.S. Pat. No. 8,211,971, which is the national stage under 35 U.S.C. §371 of PCT/EP2006/069308 filed Dec. 5, 2006.

BACKGROUND OF THE INVENTION

1. Field of the Invention

The invention relates to fumed silanized silica, to a process for preparing it and to its use.

2. Description of Related Art

Fumed silica (pyrogenically prepared silicon dioxide) is known from Ullmanns Enzyklopädie der technischen Chemie, Volume 21, page 464 (1982).

It is prepared by burning a vaporizable silicon compound, such as silicon tetrachloride, for example, in a mixture with hydrogen and oxygen.

The comminution of materials to form coarse powders (50-500 µm), fine powders (5-50 µm) and even greater finenesses (less than 5 µm) is common and widespread practice. For all comminution tasks there is a multiplicity of technical and industrial equipment offered and operated, all adapted to the particular circumstances of the specific tasks. A good overview of the comminution problems and of the diverse machines is given in Ullmanns Enzyklopädie der technischen Chemie, 3rd Edition, Volume 1, pages 616 to 638.

For fumed silica the average primary particle diameters are notably lower (5-50 nm) than can be obtained by mechanical comminution.

The primary particles and aggregates of the fumed silica with a surface area of 200 $m^2/g$ can be visualized in the electron microscope.

The primary particles and aggregates of a fumed silica agglomerate to form larger assemblies whose size is generally in inverse proportion to the primary particle size or in proportion to the specific surface area. The agglomerate size also increases in line with the extent to which the fumed silica is compacted.

The binding forces holding these agglomerates together are relatively weak. Nevertheless, when these agglomerates are incorporated into and broken down in a liquid system for the purpose of homogeneous distribution of the primary particles and aggregates, or particles with a low degree of agglomeration, a certain shearing energy is required. Depending on the particular field of application, dispersing is carried out using any of a very wide variety of mixing devices, with determining factors for the selection being not only the viscosity and polarity of the system but also the agglomerate strength and the desired homogeneity.

With simple agitator mechanisms, such as paddle stirrers, it is usually not possible to carry out to satisfaction the direct incorporation of small amounts of silicas, especially not when the systems in question are of low viscosity. However, paint and varnish makers, and also those who carry out processing, have an interest in obtaining performance-optimum distribution of the silicas, which are used predominantly as thickeners and thixotropic agents, by means of very simple devices, with a very low energy input and in a very short time.

In the case of paddle-stirrer dispersing, the coarse silica agglomerates are not sufficiently comminuted and hence are able to make only a small contribution to raising viscosities and thixotropy. The data relate to a UP resin (unsaturated polyester resin) as dispersion medium.

Reducing the agglomerate size by dispersing outside a liquid system, in other words, in practice, in the air, or by grinding in the conventional sense, is possible only to a limited extent, since in the case of material with a given propensity to agglomerate the comminution is followed immediately by the re-establishment of the old agglomeration state. This effect comes about no later than after recompaction of the material which as a result of the mechanical intervention has undergone a high degree of loosening and which in this form is not amenable to dispatch and storage. The storage time as well would have the effect of renewed agglomerate enlargement.

A value taken as a dimensional number and evaluation variable for the stage of distribution of a dispersible silica and maximum agglomerate size of the dispersion (granularity) is the so-called grindometer value to DIN 53203.

A known procedure is to render fumed silica hydrophobic, to grind it in a pinned-disc mill and then to classify it (US 2004/0110077 A1).

This known silica is used as an external additive in toner mixtures.

Hydrophilic fumed silica with a BET surface area possesses a grindometer value as determined in UP resin (unsaturated polyester resin Ludepal P6 from BASF, 2% dispersion) in accordance with the DIN specification, of 50 to 60.

If this fumed silica is also relatively highly compacted (100 to 120 g/l), the grindometer value as well is also significantly higher, specifically more than 100, whereby necessitating an additional, not inconsiderable energy as a thickener and thixotropic agent.

A known procedure is to grind a highly dispersed silica having a surface area of approximately 300 $m^2/g$ in a pinned-disc mill.

The grindometer value achieved is initially, for the uncompacted silica, 25.

If this silica is compacted to 50 g/l, the grindometer value rises to 30, and in the case of further compaction to 75 g/l it rises to as far as about 40.

In the case of storage over a period of three months, the ground silica, not modified but compacted to 50 g/l, has a grindometer value of 50 to 60.

Reagglomeration can only be prevented in accordance with the prior art if the hydrophilic silica is mixed with 3% by weight of a hydrophobic silica and if this mixture is ground by means of an air-jet mill or a pinned-disc mill (EP 0 076 377 B1).

In this case, for a fumed silica having a BET surface area of 200 $m^2/g$, even after compaction to 73 or 107 g/l, a grindometer value of 35 is achieved.

For a fumed silica having a BET surface area of 300 $m^2/g$, the addition of hydrophobic silica prior to grinding produces a grindometer value of 10 for a tamped density of 28.1 g/l and of 15 to 20 for a tamped density of 50 g/l.

The known fumed silicas have the disadvantage that they contain an unwanted fraction of hydrophobic silica.

BRIEF SUMMARY OF THE INVENTION

The invention provides a fumed silanized silica which is characterized in that it has the following physicochemical data:
  Grindometer value less than 20 µm
  Tamped density 25 to 85 g/l
The invention further provides a process for preparing the silica of the invention which is characterized in that silanized, structurally modified fumed silicas which are characterized by groups fixed on the surface, the groups being dimethylsilyl and/or monomethylsilyl, preferably dimethylsilyl, are ground.

In one preferred embodiment of the invention the silicas used can have the following physicochemical data:

| BET surface area m²/g: | 25-400 |
| Average primary particle size nm: | 5-50 |
| pH: | 3-10 |
| Carbon content %: | 0.1-10 |

Fumed silicas are known from Winnacker-Küchler Chemische Technologie, Volume 3 (1983) 4th edition, page 77 and Ullmanns Enzyklopädie der technischen Chemie, 4th edition (1982), Volume 21, page 462.

Fumed silicas are prepared in particular by flame hydrolysis of vaporizable silicon compounds, such as $SiCl_4$, for example, or organic silicon compounds, such as trichloromethylsilane.

The silanized, fumed silicas used in accordance with the invention can be prepared by treating fumed silica in a known way with dimethylchlorosilane and/or monomethyltrichlorosilane, the groups dimethylsilyl and/or monomethylsilyl being fixed on the surface of the fumed silica.

In one particular embodiment of the invention the initial silica used can be a fumed silicon dioxide which has been hydrophobicized by means of dimethyldichlorosilane.

The grinding of the silanized fumed, silica can take place by means of a pinned-disc mill or an air-jet mill.

The silica of the invention shows no propensity to reagglomerate. The grindometer value is below 20.

The fumed silica of the invention can be used as a filler in silicone rubber compounds.

Silicone rubber compounds and the use of fumed silica (AEROSIL®) in silicone rubber compounds are known (Ullmann's Encyclopaedia of Industrial Chemistry, Volume A 23, Rubber, 1, 221 ff.; Rubber 3, 3,6 ff.; Volume A 24, Silicones 57 ff. 1993).

Fumed silica is used on account of its excellent thickening effect (thixotroping) in silicone sealants, this thickening effect being desirable in the context of use as a jointing compound.

Where, however, the silicone rubber compounds are to be used as coating materials, a low level of thickening is desired (U.S. Pat. No. 6,268,300).

Of decisive importance in both cases is the optical quality of the surface of the silicone vulcanizates.

It is an object of the present invention, therefore, to provide silicone rubber compounds which through the use of fumed silica as filler exhibit an optically high-grade surface after vulcanization.

The invention provides silicone rubber compounds containing 0.5% to 60% by weight, based on the total mass, of the fumed silica of the invention having the following characteristic physicochemical data:

| Grindometer value | less than 20 |
| Tamped density | 25 to 85 g/l | and

40% to 99.5% by weight, based on the total mass, of an organopolysiloxane of the formula

where R=alkenyl, alkoxy, aryl, oxime, acetoxy, alkyl radicals, having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 40-10 000 repeater units.

Z=OH, Cl, Br, acetoxy, amino, amineoxy, oxime, alkoxyamido, alkenyloxy, acryloxy or phosphate radicals, it being possible for the organic radicals to carry up to 20 carbon atoms, and in each case identical or different.

Z'=oxime, alkoxy, acetoxy, amino, amido, n=1-3 x=100-15 000.

As organopolysiloxane it is possible to use all polysiloxanes which have or have been able to be used to date as a basis for room-temperature-crosslinking (room-temperature-vulcanizing) (RTV) compositions. They may be described for example by the general formula

where x, R, Z' and Z have the following definitions:
where R=alkenyl, alkoxy, aryl, oxime, acetoxy, alkyl radicals, having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 40-10 000 repeater units.

Z=OH, Cl, Br, acetoxy, amino, amineoxy, oxime, alkoxyamido, alkenyloxy, acryloxy or phosphate radicals, it being possible for the organic radicals to carry up to 20 carbon atoms, and in each case identical or different.

Z'=oxime, alkoxy, acetoxy, amino, amido, n=1-3 x=100-15 000.

Within and/or along the siloxane chain in the formula indicated above it is also possible for there to be other siloxane units present, usually only as impurities, in the form of diorganosiloxane units, for example those of the formula $RSiO_{3/2}$, $R_3O_{1/2}$ and $SiO_{4/2}$, R in each case having the definition indicated for it above. The amount of these other siloxane units ought not to exceed 10 mol percent.

Examples of R with the definition alkyl radical are, for example, methyl, ethyl, propyl, hexyl and octyl radicals; possible alkenyl radicals are vinyl, allyl, ethylallyl and butadienyl radicals; and as aryl radicals it is possible to use phenyl and tolyl radical.

Examples of substituted hydrocarbon radicals R are in particular halogenated hydrocarbon radicals such as 3,3,3-trifluoropropyl radical, chlorophenyl and bromotolyl radical; and cyanoalkyl radicals, such as the β-cyanoethyl radical.

Examples of polymers as radical R are polystyrene, polyvinyl acetate, polyacrylate, polymethacrylate and polyacrylonitrile radicals which are attached to silicon via carbon.

On account of the greater ease of access the predominant fraction of the radicals R is composed of methyl groups. The other radicals R are, in particular, vinyl and/or phenyl groups.

Particularly in the case of the presence of formulations which are storable in the absence of water and which cure to elastomers at room temperature on ingress of water, Z and Z' are hydrolysable groups. Examples of such groups are acetoxy, amino, amineoxy, alkenyloxy (for example $H_2C=$(CH_3CO—))$, acyloxy and phosphate groups. Primarily on account of the greater ease of access, preferred groups Z are acyloxy groups, especially acetoxy groups. Excellent results, however, are also achieved using, for example, oxime groups, such as those of the formula —ON=C(CH$_3$)(C$_2$H$_5$), as Z. Examples of hydrolysable atoms Z are halogen and hydrogen atoms; examples of alkenyl groups Z are, in particular, vinyl groups.

The viscosity of the organopolysiloxanes used in the context of the invention ought not to exceed 500 000 cP at 25° C., preferably 150000 cP at 25° C. Accordingly the value x ought preferably not to exceed 40 000.

Examples of organopolysiloxanes which can be used are, for example, the silicone polymers E50 (α,ω-hydroxydimethylsiloxypolydimethylsiloxane) or M50 (α,ω-hydroxydimethylsiloxypolydimethylsiloxane) from GE Bayer Silicones.

Mixtures of different organopolysiloxanes can also be used.

The mixing of these organopolysiloxanes with the fumed silica and, where appropriate, with the further constituents of the formulation of the invention can take place in any desired known way, for example in mechanical mixing devices. It is accomplished very rapidly and easily, irrespective of the sequence in which the mixing constituents are added.

Preferably the fumed silicas of the invention are used in amounts of 0.5% to 60% by weight, preferably 3% to 30% by weight, based on the total weight of the compounds which can be cured to elastomers.

If the only reactive terminal units present in the diorganopolysiloxanes which contain reactive terminal units are those having Si-bonded hydroxyl groups, then these diorganopolysiloxanes must be crosslinked. This can be done in a conventional way by means of the water present in the air, with the addition where appropriate of further water, with a crosslinking agent. Here it is possible for example to use the Silopren crosslinker 3034 from GE Bayer Silicones, the ethyltriacetoxysilane optionally in the presence of a condensation catalyst in a known way. Suitable catalysts for all formulations of the invention are, for example, the Silopren catalysts DBTA or type 162 dibutyltin diacetate or dilaurate from the same manufacturer.

In one particular variant of the silicone rubber compounds of the invention it is possible additionally for there to be 0.5%-20%, preferably 2%-10% by weight, based on the total weight of the compound, of a crosslinker having the formula

with R=alkyl, alkoxy, acetoxy, oxime, aryl, alkene radicals, having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 5-5000 repeater units, Z'=OH, Cl, Br, acetoxy, oxime, amino, amineoxy, alkenyloxy or phosphate radicals, it being possible for the organic radicals to carry up to 20 carbon atoms, in each case identical or different, and t=3 or 4.

All weight data relate to the total amount of silicone rubber compounds.

Examples of silanes of the formula indicated above are ethyltriacetoxysilane, methyltriacetoxysilane, isopropyltriacetoxysilane, isopropoxytriacetoxysilane, vinyltriacetoxysilane, methyltrisdiethylaminooxysilane, methyltris(cyclohexylamino)silane, methyltris(diethylphosphato)silane and methyltris(methylethylketoximo)silane.

Of course it is possible for formulations of the invention to contain, besides organopolysiloxanes, hydrophobicized silica, crosslinking agents and crosslinking catalysts, if desired, fillers which are conventionally used mostly or frequently in compounds which can be cured to elastomers. Examples of such substances are fillers having a surface area below 50 m$^2$/g, such as coarse quartz powder, kaolin, phyllosilicates, clay minerals, diatomaceous earth, additionally zirconium silicate and calcium carbonate, and also untreated pyrogenically produced silicon dioxide, organic resins, such as polyvinyl chloride powders, organopolysiloxane resins, fibrous fillers, such as asbestos, glass fibres and organic pigments, soluble dyes, fragrances, corrosion inhibitors, curing retardants, such as benzotriazole, and plasticizers, such as dimethylpolysiloxanes end-blocked by trimethylsiloxy groups.

Optionally the RTV 1K [one-component] silicone rubber compounds of the invention can contain 0.1%-20%, preferably 0.1%-15%, with particular preference 0.1%-10% by weight (based on the total amount of the formulation (of water-binding substances). Suitable substances for this purpose are, for example, carboxylic anhydrides, for example acetic anhydride or maleic anhydride, and/or carbonic esters, such as for example diethyl carbonate, ethyl carbonate and/or alkenyloxy compounds and/or ketals, such as dimethyldioxolane, for example. It is possible to use one or more of these substances.

Additionally the silicone rubber compounds may contain 0.01% to 99.5% by weight of an unfunctionalized polysiloxane. Here it is possible to use the polysiloxanes already specified, provided that they are not functionalized. One suitable, non-functional polysiloxane is, for example, Baysilone oil M1000 (polydimethylsiloxane) from GE Bayer Silicones.

Additionally the silicone rubber compounds may contain 0.01% to 6% by weight of organic or inorganic compounds of the metals Pt, Sn, Ti and/or Zn as catalyst and/or 0.01% to 6% by weight of inhibitors and/or 0.01%-6% by weight of fungicides and/or bactericides and/or 0.01% to 6% by weight of adhesion promoters (such as, for example, Silopren adhesion promoter 3001 from GE Bayer Silicones, with the composition: di-tert-butoxydiacetoxysilane). As fungicides/bactericides it is possible for example to use isothiazolinone, Vinycin or benzisothiazolinone.

The silicone rubber compounds of the invention can be used as silicone rubber systems from the group of the room-temperature-vulcanizing one-component (1K RTV) silicone rubber sealants and also self-levelling room-temperature-crosslinking silicone rubber compounds (1K RTV).

The silicone rubber compounds can be used as jointing compounds, window sealants, seals in motor vehicles, sports equipment and household appliances, heat-resistant seals, oil-exuding and chemical-resistant seals, and water-vapour-resistant seals, and seals in electrical and electronic appliances.

The silicone rubber compounds can be used as coating materials for textiles, e.g. lace tape (antislip), and textile materials, e.g. woven glass fabric or woven nylon fabric.

The vulcanizates of the silicone rubber compounds of the invention advantageously have a high-grade surface.

Figure 1:
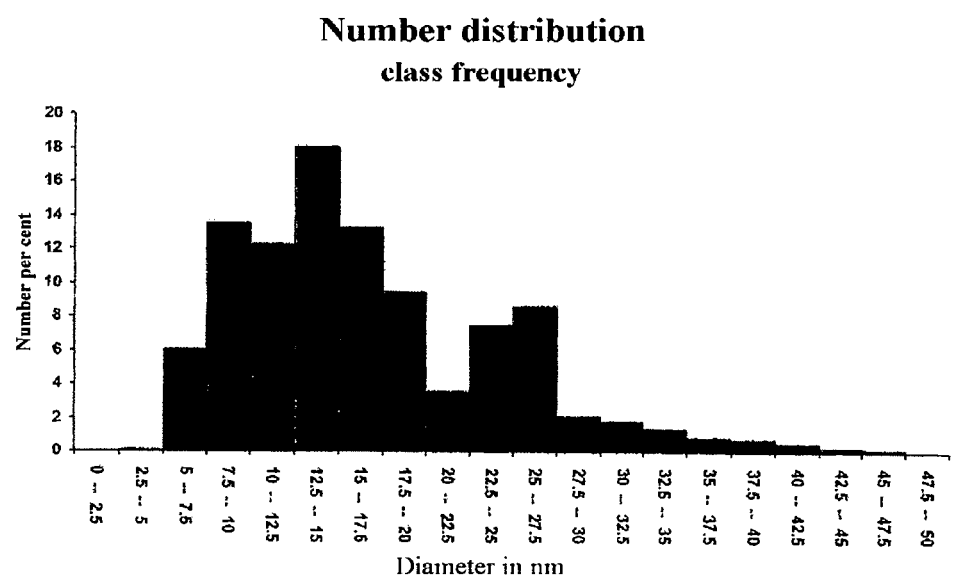
FIG. 1 shows the number distribution (class frequency) for the product of Example 1 as graphical representation where number percent is plotted versus particle diameter (nm).

The inventive examples were produced by metering commercial AEROSIL® R 972 (bagged product) into the mill employed, using a metering balance, and subjecting it to grinding. The physicochemical data of the AEROSIL®972 are listed in Table 1.

The parameters of the production process are listed in Table 2.

The experiments were carried out using a pinned-disc mill (Alpine 160Z, rotor diameter 160 mm) or an air-jet mill (grinding chamber diameter: 240 mm, grinding chamber height: 35 mm). The ground product was isolated with a hose filter (filter area: 3.6 m$^2$, filter material: woven nylon fabric). In further experiments the ground product obtained was packaged into commercially customary bags using a commercially customary bagging machine. In further experiments the bags packed with ground product were levelled prior to palletization, using a method routine in the industry and suitable for the purpose.

TABLE 1

Fumed silica employed

|  |  | AEROSIL ® R 972 |
|---|---|---|
| Attitude to water |  | hydrophobic |
| Appearance |  | white powder |
| BET surface area[1] | m$^2$/g | 90-130 |
| Average primary particle size | nm | 16 |
| Tamped density[2] | g/l | about 50 |
| Loss on drying[3] (2 h at 105° C.) | % by weight on leaving supply plant | <=0.5 |
| Loss on ignition[4)5] (2 h at 1000° C.) | % by weight | <=2.0 |
| C content | % by weight | 0.6-1.2 |
| pH[6)7] |  | 3.6-4.4 |
| SiO$_2$ content[8] | % by weight | >=99.8 |
| Al$_2$O$_3$ content[8] | % by weight | <=0.050 |
| Fe$_2$O$_3$ content[8] | % by weight | <=0.010 |
| TiO$_2$ content[8] | % by weight | <=0.030 |
| HCl content[8)9] | % by weight | <=0.050 |

[1] To DIN ISO 9277
[2] To DIN EN ISO 787-11, JIS K 5101/20 (unsieved)
[3] To DIN EN ISO 787-2, ASTM D 280, JIS K 5101/23
[4] To DIN EN 3262-20, ASTM D 1208, JIS K 5101/24
[5] Based on the substance dried at 105° C. for 2 hours
[6] To DIN EN ISO 787-9, ASTM D 1208, JIS K 5101/26
[7] Water:methanol = 1:1
[8] Based on the substance calcined at 1000° C. for 2 hours
[9] HCl content in constituent from loss on ignition

TABLE 2

Preparation of the inventive example parameters

| Designation | Mill* | GA** quantity [m$^3$] | GA** pressure [bar] | IA*** quantity [m$^3$] | IA*** pressure [bar] | Metering [kg/h] | Bagging | Levelling |
|---|---|---|---|---|---|---|---|---|
| Example 1 | AJ | 11.8 | 1.0 | 6.8 | 1.2 | 10 | no | no |
| Example 2 | AJ | 11.8 | 1.0 | 6.8 | 1.2 | 10 | yes | no |
| Example 3 | AJ | 11.8 | 1.0 | 6.8 | 1.2 | 10 | yes | yes |
| Example 4 | AJ | 27.3 | 3.5 | 15.8 | 3.7 | 10 | no | no |
| Example 5 | AJ | 27.3 | 3.5 | 15.8 | 3.7 | 10 | yes | no |
| Example 6 | AJ | 27.3 | 3.5 | 15.8 | 3.7 | 10 | yes | yes |
| Example 7 | PD | — | — | — | — | 10 | no | no |
| Example 8 | PD | — | — | — | — | 10 | yes | no |
| Example 9 | PD | — | — | — | — | 10 | yes | yes |
| Example 10 | PD | — | — | — | — | 20 | no | no |
| Example 11 | PD | — | — | — | — | 20 | yes | no |
| Example 12 | PD | — | — | — | — | 20 | yes | yes |

AJ* = Air-jet mill
PD = Pinned-disc mill
GA** = Grinding air
IA*** = Injector air

TABLE 3

Physicochemical data of the inventive silicas and the comparative example

| Designation | BET specific surface area [m²/g] | pH | Tamped density [g/l] | Grindometer value [μm] |
|---|---|---|---|---|
| Comparative Example | 103 | 4.2 | 71 | 45 |
| Example 1 | 102 | 4.2 | 27 | <20 |
| Example 2 | 103 | 4.1 | 77 | <20 |
| Example 3 | 104 | 4.0 | 81 | <20 |
| Example 4 | 103 | 4.2 | 31 | <20 |
| Example 5 | 104 | 4.2 | 58 | <20 |
| Example 6 | 103 | 4.2 | 80 | <20 |
| Example 7 | 103 | 4.2 | 31 | <20 |
| Example 8 | 104 | 4.2 | 72 | <20 |
| Example 9 | 105 | 4.2 | 71 | <20 |
| Example 10 | 104 | 4.2 | 28 | <20 |
| Example 11 | 104 | 4.2 | 75 | <20 |
| Example 12 | 104 | 4.2 | 70 | <20 |

With virtually the same specific surface areas and unchanged pH values, the data of the ground products exhibit lower grindometer values. Surprisingly the lower grindometer values are retained in spite of the compaction, evident through the tamped density, as a result of bagging or bagging/levelling.

In some cases the tamped densities are in fact above that of the oxide used, i.e. the oxides of the invention, despite the same or even higher compaction, exhibit lower grindometer values.

TABLE 4

Particle size determination by evaluation of TEM micrographs

| Designation | DA [nm] | DV [nm] | D50 (g) [nm] | Total span [nm] |
|---|---|---|---|---|
| Comparative example | 32.458 | 41.608 | 38.466 | 3.420-90.82 |
| Example 1 | 23.532 | 26.673 | 25.746 | 3.420-45.740 |
| Example 4 | 25.680 | 34.157 | 27.306 | 2.500-70.580 |
| Example 7 | 29.670 | 39.071 | 34.679 | 4.340-82.540 |
| Example 10 | 29.491 | 39.810 | 33.864 | 4.340-87.140 |

DA = Particle diameter, averaged over surface area
DV = Particle diameter, averaged over volume
D50 (g) = Median value, weight distribution The inventive fumed silica can have a D50 (g) (i.e. median value, weight distribution) of 25.7 to 35.0 nm.

The total span of the particles can be 2500 to 87.140 nm.

The particle diameter averaged over the surface area, DA, can be 23.0 to 30.9 nm.

The particle diameter averaged over the volume, DV, can be 26.5 to 40.0 nm.

Figure 2:
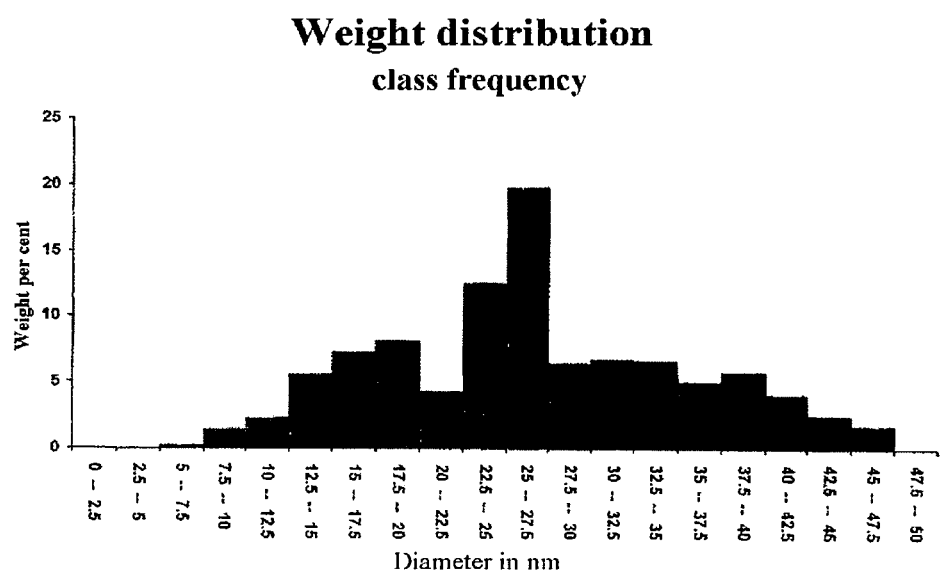
FIG. 2 shows the weight distribution (class frequency) for the product of Example 1 as graphical representation where weight percent is plotted versus particle diameter (nm).
Figure 3:
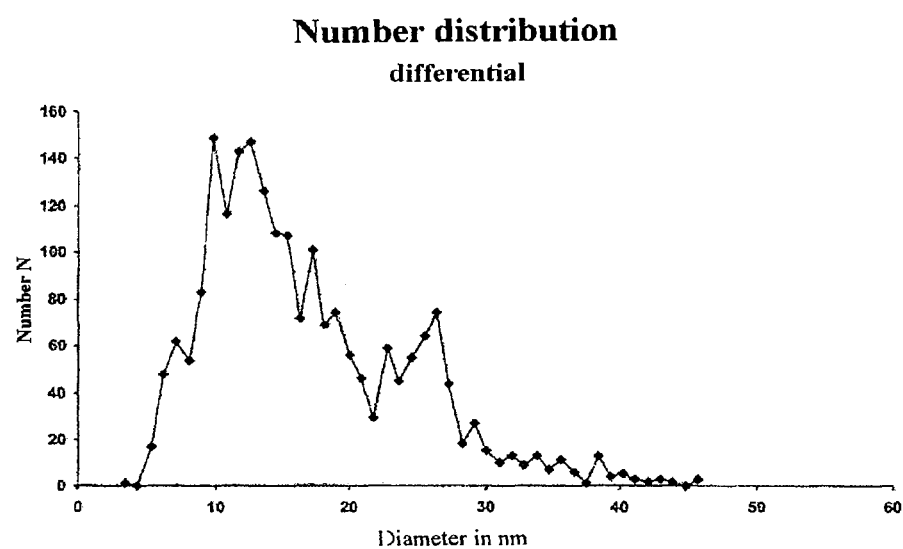
FIG. 3 shows the number distribution (differential) for the product of Example 1 as graphical representation where number N is plotted versus particle diameter (nm).
Figure 4:
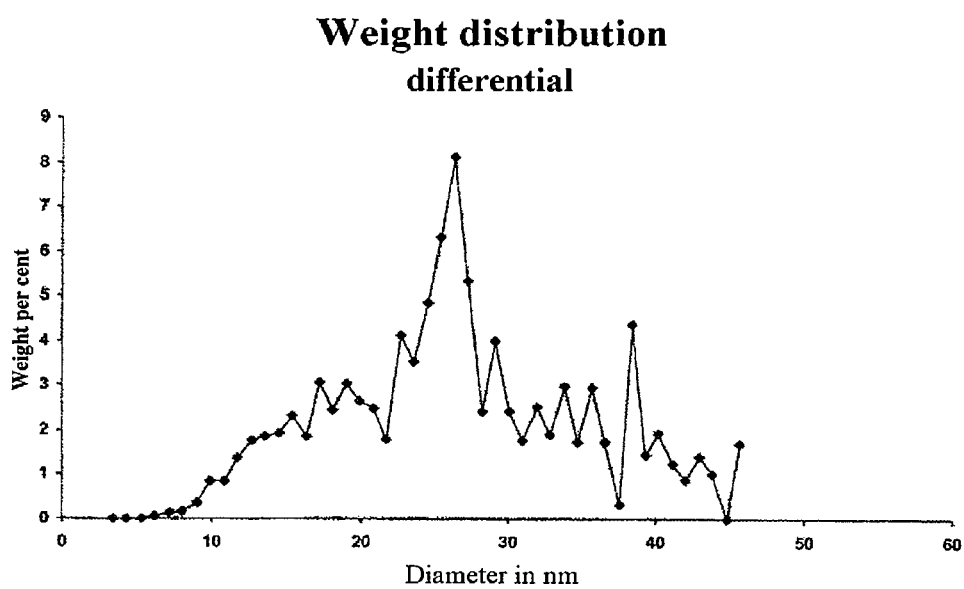
FIG. 4 shows the weight distribution (differential) for the product of Example 1 as graphical representation where weight percent is plotted versus particle diameter (nm).
Figure 5:
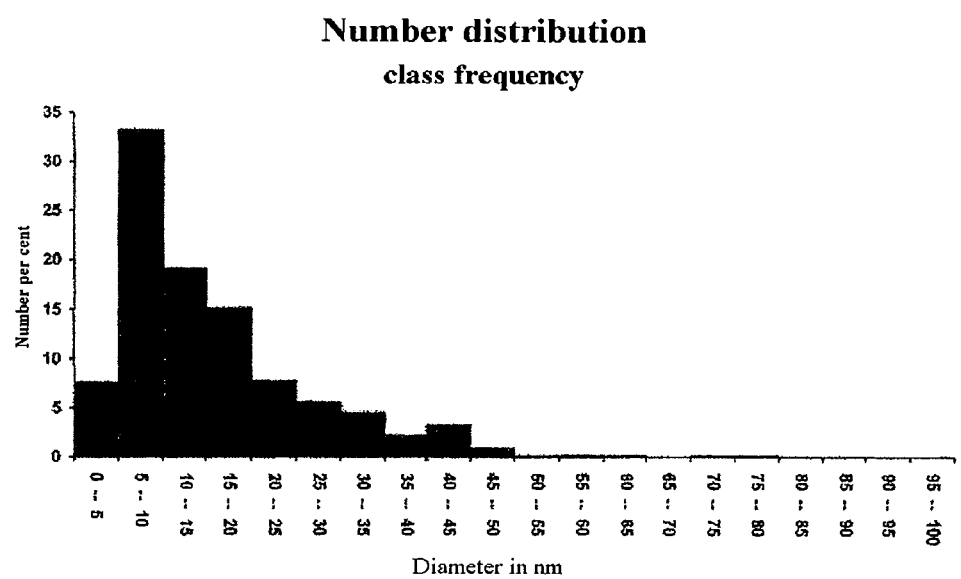
FIG. 5 shows the number distribution (class frequency) for the product of the comparative example as graphical representation where number percent is plotted versus particle diameter (nm).
Figure 6:
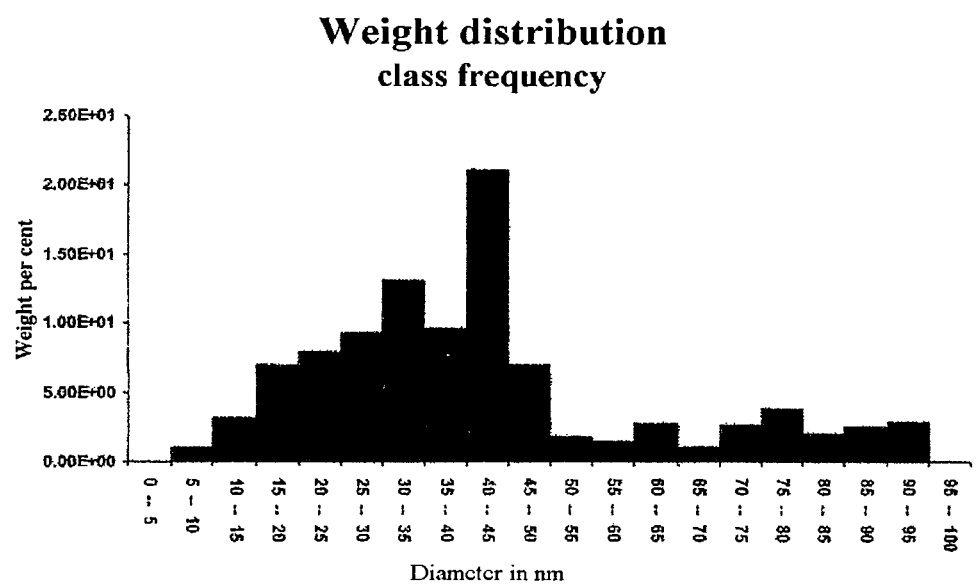
FIG. 6 shows the weight distribution (class frequency) for the product of the comparative example as graphical representation where weight percent is plotted versus particle diameter (nm).
Figure 7:
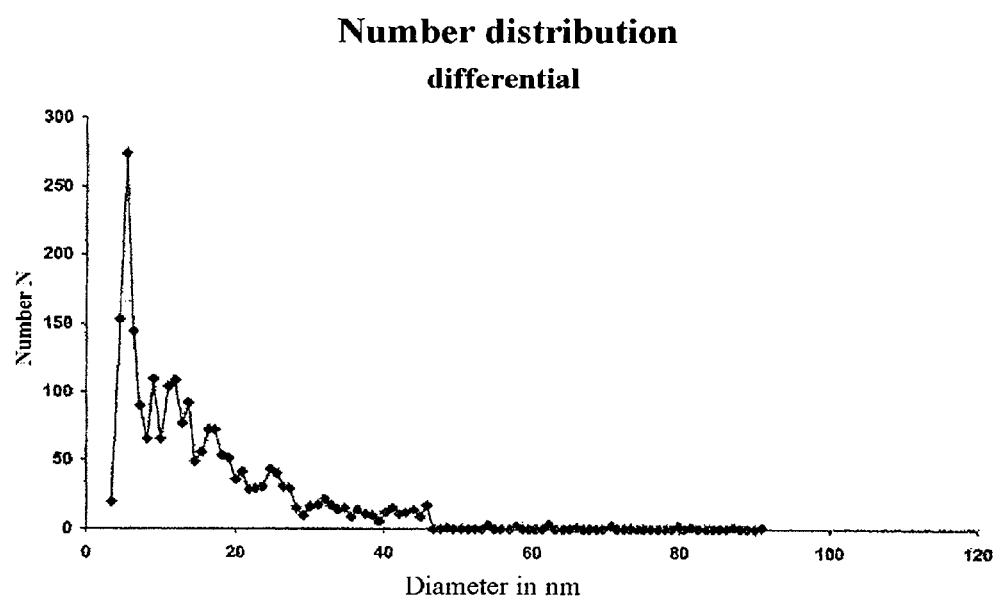
FIG. 7 shows the number distribution (differential) for the product of the comparative example as graphical representation where number N is plotted versus particle diameter (nm).
Figure 8:
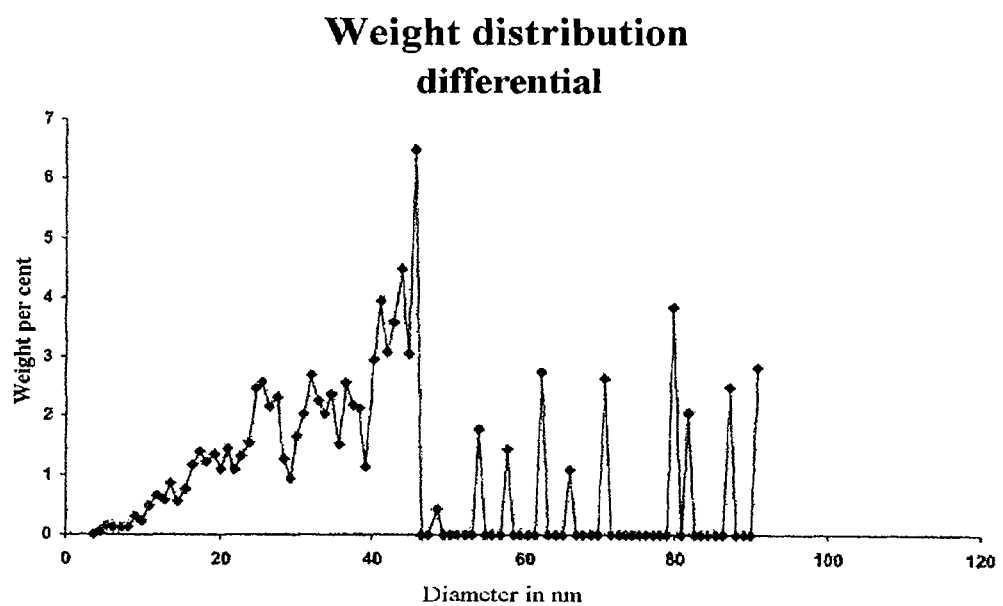
FIG. 8 shows the weight distribution (differential) for the product of the comparative example as graphical representation where weight percent is plotted versus particle diameter (nm).

FIGS. 1 to 8 show the graphical representation of the distributions, measured on the silicas of Example 1 (in accordance with the invention) and of the comparative example.

TABLE 5

Particle size determination by Cilas

| Designation | d50 value [μm] |
|---|---|
| Comparative example | 46.75 |
| Example 1 | 6.95 |
| Example 2 | 6.54 |
| Example 3 | 6.61 |
| Example 4 | 4.57 |
| Example 7 | 5.11 |
| Example 9 | 6.34 |
| Example 10 | 6.5 |
| Example 11 | 6.36 |
| Example 12 | 6.5 |

The silica of the invention can have a d50 value as determined by Cilas of 4.5 to 7.0 μm.

BET Surface Area

The BET surface area is determined in accordance with DIN ISO 9277.

Tamped Density

The tamped density is determined in accordance with DIN EN ISO 787-11.

Principles of Tamped Density Determination:

The tamped density (formerly tamped volume) is equal to the ratio of the mass to the volume of the powder after tamping in a tamping volumeter under defined conditions. According to DIN ISO 787/XI the tamped density is reported in g/cm³. Owing to the very low tamped density of the oxides, however, we state the value in g/l. Furthermore, the drying and sieving, and the repetition of the tamping process, are omitted.

Apparatus for Tamped Density Determination:
Tamping volumeter
Measuring cylinder
Laboratory balance (reading accuracy 0.01 g)
Tamped Density Determination Procedure:

200±10 ml of oxide are introduced into the measuring cylinder of the tamping volumeter so that there are no cavities remaining and so that the surface is horizontal.

The mass of the sample introduced is determined to an accuracy of 0.01 g. The measuring cylinder containing the sample is inserted into the cylinder holder of the tamping volumeter and tamped 1250 times.

The volume of the tamped oxide is read off to an accuracy of 1 ml.

Evaluation of Tamped Density Determination:

$$\text{Tamped density} (g/l) = \frac{g \text{ initial mass} \times 1000}{\text{ml volume read off}}$$

pH
Reagents for pH Determination:
Distilled or deionized water, pH>5.5
Methanol, p.a.
Buffer solutions pH 7.00 pH 4.66
Apparatus for pH Determination:
Laboratory balance (reading accuracy 0.1 g)
Glass beaker, 250 ml
Magnetic stirrer
Magnetic rod, length 4 cm
Combined pH electrode
pH meter
Dispensette, 100 ml
Procedure for Determining pH:

The determination takes place in a modification of DIN EN ISO 787-9.

Calibration: Prior to pH measurement the meter is calibrated using the buffer solutions. Where two or more measurements are carried out one after another, a single calibration is sufficient.

4 g of oxide are pasted in a 250 ml glass beaker with 48 g (61 ml) of methanol and the suspension is diluted with 48 g (48 ml) of water and stirred for five minutes, with a pH electrode immersed, using a magnetic stirrer (speed about 1000 min$^{-1}$).

After the stirrer has been switched off the pH is read off after a standing time of one minute. The result is reported to one decimal place.

Grindometer Value

Principles:

The degree of dispersion determines the performance properties of the liquid thickened with Aerosil. The measurement of the grindometer value serves to assess the degree of dispersion. By the grindometer value is meant the boundary layer thickness below which the particles or aggregates present become visible on the surface of the sample which has been coated out.

The sample is coated out in a groove with a scraper, the depth of the groove at one end being twice the size of the diameter of the largest Aerosil particles, and decreasing steadily down to 0 at the other end. On a scale indicating the depth of the groove, the depth value is read off, in micrometers, the value in question being that below which a relatively large number of Aerosil particles becomes visible as a result of bits or scratches on the surface of the binder system. The value read off is the grindometer value of the system present.

Apparatus and Reagents:

Hegmann grindometer with a depth range of 100-0 micrometer.

Polyester resin dispersion with 2% Aerosil, prepared according to Testing Instructions 0380.

Procedure:

The grindometer block is placed on a flat, slip-proof surface and is wiped clean immediately prior to testing. The Aerosil dispersion, which must be free from air bubbles, is then applied to the deepest point of the groove in such a way that it flows off somewhat over the edge of the groove. The scraper is then held by both hands and placed, perpendicularly to the grindometer block and at right angles to its longitudinal edges, with gentle pressure, onto the end of the groove in which the dispersion is located. The dispersion is then coated out in the groove by slow, uniform drawing of the scraper over the block. The grindometer value is read off no later than 3 seconds after the dispersion has been coated out.

The surface of the spread dispersion (transverse to the groove) is viewed obliquely from above at an angle of 20-30° (to the surface). The block is held to the light in such a way that the surface structure of the spread dispersion is readily apparent.

The grindometer value read off on the scale is the value in micrometers below which a relatively large number of Aerosil particles become visible as bits or scratches on the surface. Individual bits or scratches occurring randomly are not taken into account in this context.

The granularity is assessed at least twice, in each case on a newly spread dispersion.

Evaluation:

From the measured values the arithmetic mean is formed. The relationship between the grindometer value in micrometers and the FSPT units and Hegmann units, which are based on the inch system, is as follows:

$B = 8 - 0.079A$ $C = 10 - 0.098A = 1.25B$

In this relationship:
A=Grindometer value in micrometers
B=Grindometer value in Hegmann units
C=Grindometer value in FSPT units II. Preparation of silicone rubber compounds 1. General Experimental Procedure a) Principles In order to test the performance properties of AEROSIL® in RTV1 silicone sealants, corresponding silicone compounds are prepared on the laboratory scale to a standard formulation.

b) Apparatus

The planetary dissolver must meet the following requirements:

The stirring vessel has a capacity of approximately 2 liters and is provided with a jacket with cooling-water connection. Planetary drive and dissolver drive are independent. There must be a vacuum pump present. An additional drum press makes product transfer easier. Disassembly for cleaning purposes should be rapid.

c) Formulation 62.4% silicone polymer

Silopren E 50 (GE Bayer Silicones)

24.6% silicone oil

Silicone oil M 1000 (GE Bayer Silicones)

4.0% acetate crosslinker

Crosslinker AC 3034 (GE Bayer Silicones)

1.0% adhesion promoter

Adhesion promoter AC 3001 (GE Bayer Silicones)

0.01% dibutyltin diacetate catalyst 8.0% fumed silica

AEROSIL® (Degussa AG)

d) Procedure 468.0 g of silicone polymer, 184.5 g of silicone oil, 30.0 g of crosslinker, 7.5 g of adhesion promoter are weighed out into the stirring vessel and homogenized for 1 minute with a planetary drive speed of 50 rev min$^{-1}$ and a dissolver speed of 500 rev min$^{-1}$.

Thereafter 60 g of silica are incorporated at the same speed in 2 lots (each about 30 g) and the time required for wetting is measured.

As soon as the silica is fully wetted, a reduced pressure of approximately 200 mbar is applied and dispersion is carried out for 5 minutes with the planetary stirrer at 100 rev min$^{-1}$ and the dissolver drive at 2000 rev min$^{-1}$.

A drum press is used to transfer the sealant into two aluminium tubes.

The silicone rubber compound obtained in this way is coated out using a doctor blade and vulcanized at room temperature in ambient air within 24 h. The surface of the vulcanizates is assessed visually and rated in accordance with a school grade system:

Grades: 1=very good, 2=good, 3=satisfactory, 4=unsatisfactory, 5=deficient

When the silicas from Examples 1, 3, 4, 6, 7 and 9 are used, surprisingly, good surface properties of the silicone vulcanizates are obtained, in comparison to standard material, despite the fact that these silicas in some cases have very high tamped densities, which would normally lead to a poor surface quality. The surface of the silicone vulcanizate with the standard material is no more than satisfactory.

TABLE 6

Properties of non-crosslinked sealants

| Ex. | Product silica of | Grinding Bagging | Yield point [Pa] | Viscosity D = 10 s$^{-1}$ [Pa * s] | Dispersing [grades] | Surface [grades] |
|---|---|---|---|---|---|---|
| Ex. 13 | Comp. Ex. | Reference | 176 | 85 | 1.5 | 3 |
| Ex. 14 | Example 1 | AJ No | 184 | 86 | 1.5 | 2 |
| Ex. 15 | Example 3 | AJ Carter | 173 | 87 | 1.5 | 2 |
| Ex. 16 | Example 4 | AJ No | 180 | 88 | 1.5 | 2 |
| Ex. 17 | Example 6 | AJ Carter | 165 | 84 | 1.5 | 2 |
| Ex. 18 | Example 7 | PD No | 163 | 83 | 1.5 | 2 |
| Ex. 19 | Example 9 | PD Carter | 172 | 86 | 1.5 | 2 |

Grades: 1 = very good, 2 = good, 3 = satisfactory, 4 = unsatisfactory, 5 = deficient

The invention claimed is:

1. Fumed silanized silica having the following physiochemical data:

| Grindometer value | less than 20 μm, and |
|---|---|
| Tamped density | 25 to 85 g/l | and obtained in that a fumed silica having the following physiochemical data:

| BET surface area m$^2$/g: | 25-400 |
|---|---|
| average primary particle size nm: | 5-50 |
| pH: | 3-10 |
| Carbon content %: | 0.1-10 | is silanized by means of dimethyldichlorosilane and then ground by means of a pinned-disc mill or an air-jet mill.

2. A process for preparing the fumed silanized silica according to claim 1, comprising silanizing by means of dimethyldichlorosilane a fumed silica having the following physiochemical data:

| a BET surface area m$^2$/g: | 25-400 |
|---|---|
| average primary particle size nm: | 5-50 |
| pH: | 3-10 |
| Carbon content %: | 0.1-10 | and then grinding the silanized fumed silica by means of a pinned-disc mill or an air-jet mill to form ground non-reagglomerating silanized fumed silica.

3. Silicon rubber containing as a filler the fumed silanized silica according to claim 1.

* * * * *